(12) United States Patent
Shimakura et al.

(10) Patent No.: US 8,661,205 B2
(45) Date of Patent: Feb. 25, 2014

(54) COMMUNICATION APPARATUS AND INFORMATION TRANSFER METHOD

(75) Inventors: Masami Shimakura, Machida (JP); Yuta Masuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 11/953,286

(22) Filed: Dec. 10, 2007

(65) Prior Publication Data

US 2008/0140977 A1  Jun. 12, 2008

(30) Foreign Application Priority Data

Dec. 12, 2006 (JP) .................................. 2006-334911

(51) Int. Cl.
*G06F 12/02* (2006.01)
*G06F 13/00* (2006.01)

(52) U.S. Cl.
USPC ........... 711/147; 711/118; 711/130; 711/169; 711/E12.016; 709/230; 370/469

(58) Field of Classification Search
None
See application file for complete search history.

(56) References Cited

U.S. PATENT DOCUMENTS

| 5,978,849 | A | * | 11/1999 | Khanna ......................... 709/227 |
| 6,226,680 | B1 | | 5/2001 | Boucher et al. |
| 6,490,631 | B1 | * | 12/2002 | Teich et al. .................... 709/250 |
| 6,725,378 | B1 | * | 4/2004 | Schuba et al. ................. 726/13 |
| 7,698,413 | B1 | * | 4/2010 | Minami et al. ................ 709/224 |
| 2001/0037406 | A1 | * | 11/2001 | Philbrick et al. .............. 709/250 |
| 2003/0031172 | A1 | * | 2/2003 | Grinfeld ....................... 370/389 |

FOREIGN PATENT DOCUMENTS

| JP | 62-117050 | 5/1987 |
| JP | 09-181791 A | 7/1997 |

* cited by examiner

*Primary Examiner* — Michael Krofcheck
(74) *Attorney, Agent, or Firm* — Carter, DeLuca, Farrell & Schmidt LLP

(57) ABSTRACT

A communication apparatus has plural processors to perform pipeline processing on communication data. A first processor among the plural processors transfers information, used by a second processor to perform post-stage processing of the first processor, from a first memory to a second memory.

17 Claims, 15 Drawing Sheets

FIG. 4

```
struct tcpcb {
    struct      segrsq      t_segq;     /* segment reassembly queue */
    int                     t_segqlen;  /* segment reassembly queue length */
    int                     t_dupacks;  /* consecutive dup acks rec'd */ short       t_timer[TCP_NTIMERS];   /* TCP timer */ int         t_state;                /* state of this connection */
    u_int       t_flags;

tcp_seq     snd_una;                /* send unacknowledged */
    tcp_seq     snd_max;                /* highest sequence number sent */
    tcp_seq     snd_nxt;                /* send next */
    tcp_seq     snd_up;                 /* send urgent pointer */ tcp_seq     snd_wl1;                /* window update seg seq number */
    tcp_seq     snd_wl2;                /* window update seg ack number */
    tcp_seq     iss;                    /* initial send sequence number */
    tcp_seq     irs;                    /* initial receive sequence number */ tcp_seq     rcv_nxt;                /* receive next */
    tcp_seq     rcv_adv;                /* advertised window */
    u_long      rcv_wnd;                /* receive window */
    tcp_seq     rcv_up;                 /* receive urgent pointer */ u_long      snd_wnd;                /* send window */
    u_long      snd_cwnd;               /* congestion-controlled window */
    u_long      snd_ssthresh;           /* snd_cwnd size threshold for slow start */
    tcp_seq     snd_recover;            /* for use in Fast Recovery */
```

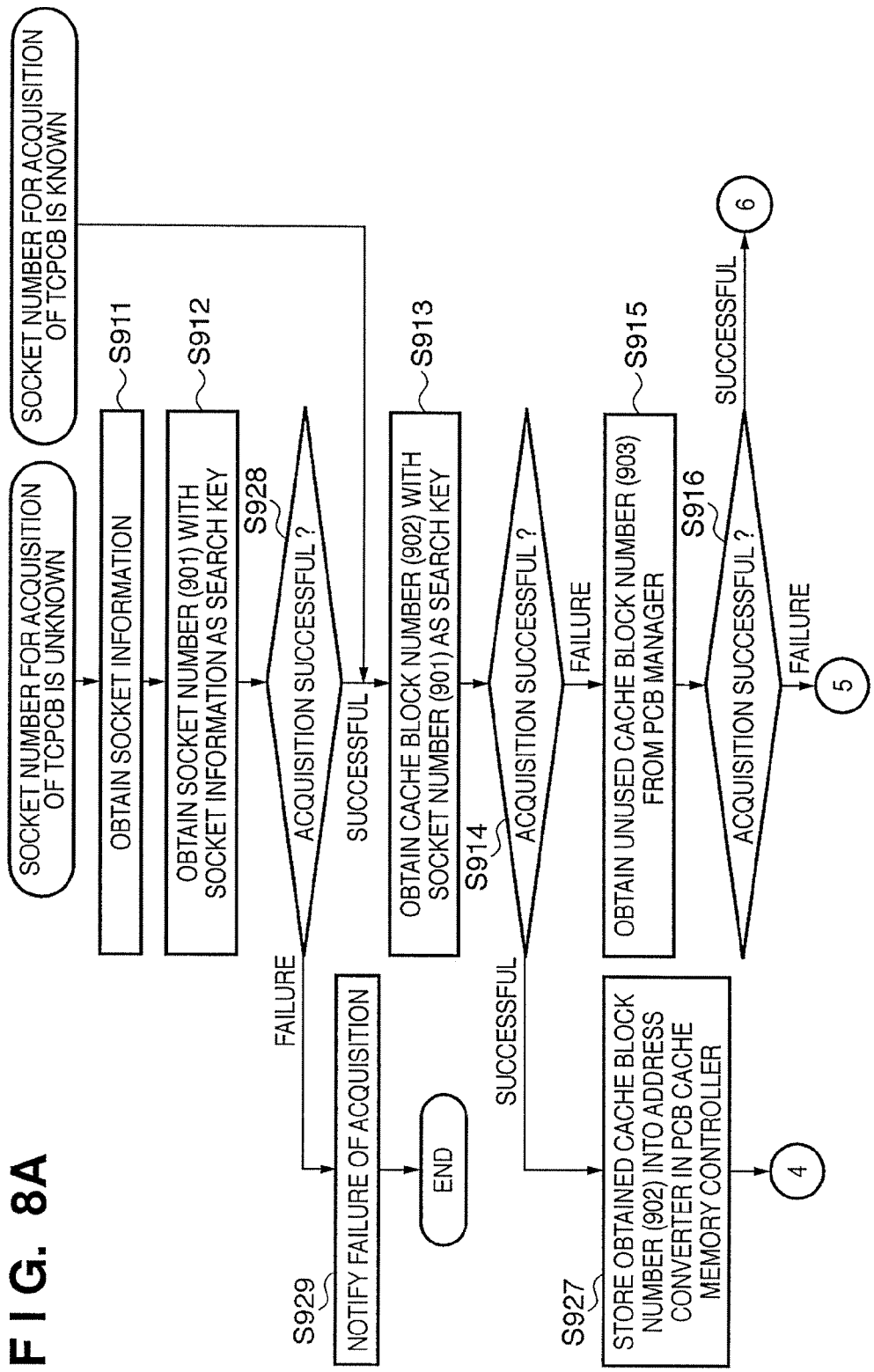

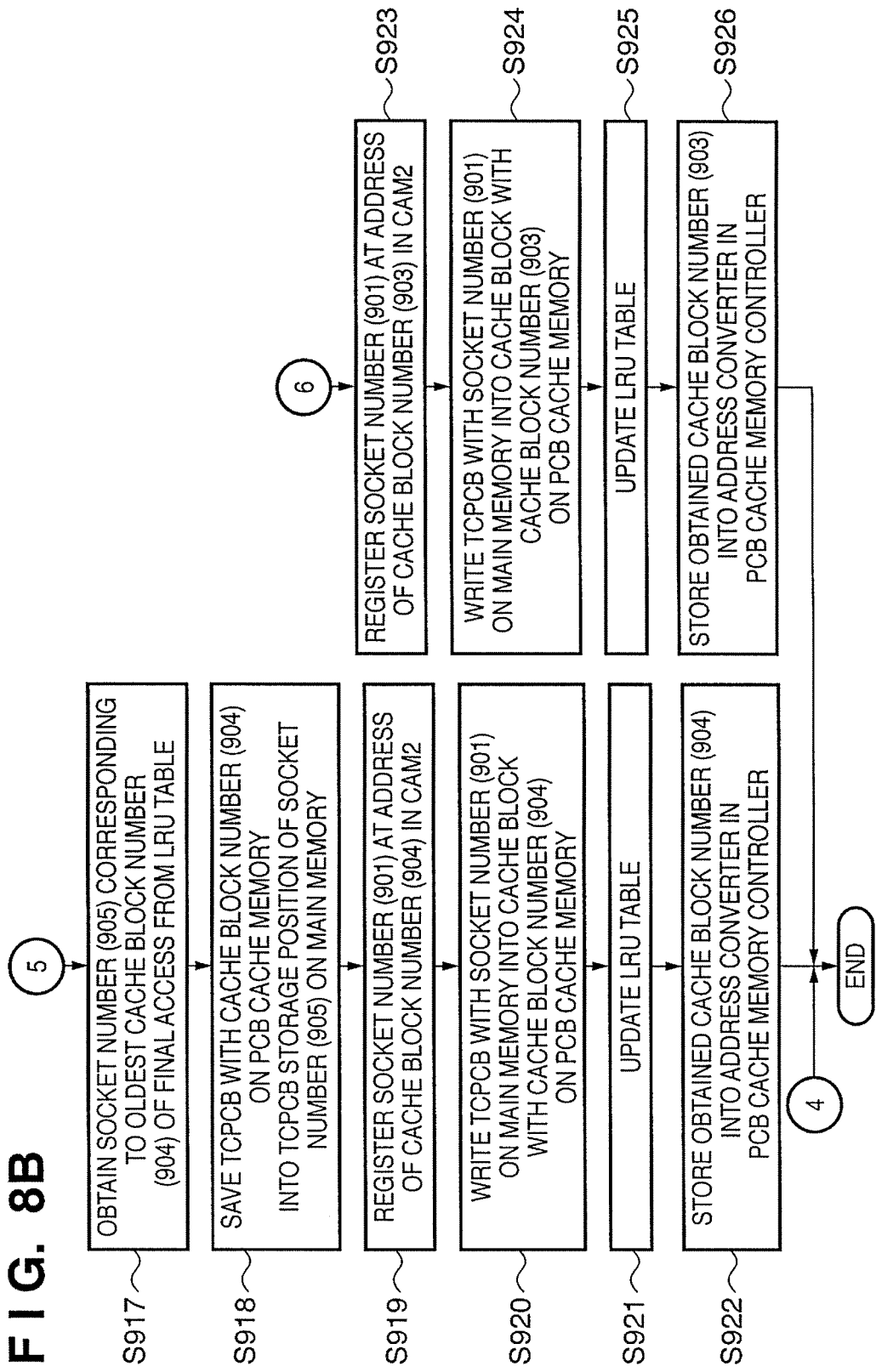

| VF | LF | HSF | TSF | RSF | Previous_Pointer | Next_Pointer | SOCKET NUMBER |

801, 802, 803, 804, 805, 806, 807, 808, 809

S (HEAD POINTER)
E (END POINTER)

(CACHE BLOCK NO. 1)
(CACHE BLOCK NO. 2)
(CACHE BLOCK NO. 3)
(CACHE BLOCK NO. 4)
(CACHE BLOCK NO. 5)
(CACHE BLOCK NO. 32)

COMMUNICATION APPARATUS AND INFORMATION TRANSFER METHOD

BACKGROUND OF THE INVENTION

1. Field of the Invention

The present invention relates to a communication apparatus and an information transfer method for information transfer between memories in the communication apparatus.

2. Description of the Related Art

In a so-called TCP/IP (Transmission Control Protocol/Internet Protocol) protocol group, TCP is a connection type protocol. TCP connection is represented with a combination of 4 informations, respective IP addresses and TCP port numbers of two network devices. The combination of these informations is called a socket pair or simply called a socket.

In recent years, built-in devices to access a network with TCP/IP for improvement in users' convenience are rapidly increased. These devices have an HTTP server function to realize checking of the status of the built-in device, changing of settings, and transmission/reception of audio information, still and moving images, from an arbitrary PC on the network or mobile terminal (including a cellular phone).

On the other hand, the speed of communication media represented by Ethernet (registered trademark) is being dramatically increased. In accordance with the increase in the speed, there is a need for execution of network protocol processing at a high speed.

To attain the Full-wire speed in a gigabit Ethernet, a processor which operates at a frequency of about 3 GHz is required. However, the performance is far beyond that of processors generally installed in the current built-in devices. Then, generally, an auxiliary device specialized for protocol processing such as a TOE (TCP/IP offload engine) is added to the system, thereby broadband network communication is realized. U.S. Pat. No. 6,226,680 discloses a conventional TOE technique.

In the protocol processing, how to handle a PCB (Protocol Control Block), context information or a group of context information necessary for processing an arbitrary communication protocol. Particularly, in the TCP/IP protocol, the PCB is called a TCP Protocol Control Block, and is generally abbreviated to TCPPCB, TCPCB or TCB.

A TCPCB, constituted with several ten types of parameters (variables), is prepared for each connection. Further, upon reception of a TCP packet, it is necessary to make a search and determine a TCPCB to be used. Note that the respective elements of the TCPCB are variables frequently accessed during TCP processing.

In the invention disclosed in the U.S. Pat. No. 6,226,680, a PCB necessary for performing TCP processing is duplicated from a main memory onto a high-speed primary memory such as an SRAM (Static Random Access Memory) thereby access speed is increased. At this time, when the number of connections has been increased and all the PCBs are not held in the primary memory, replacement processing is performed between the main memory and the primary memory such that only necessary PCBs exist on the primary memory.

Further, Japanese Patent Application Laid-Open No. Sho 62-117050 discloses pipeline processing performed by plural processors on a protocol stack.

In the invention disclosed in the U.S. Pat. No. 6,226,680, it is necessary to make a search and determine a PCB to be used upon reception of TCP packet. The respective elements of the PCB are variables frequently accessed during TCP processing. For speeding up of the TCP processing, it is necessary to increase the speed of the search and access for/to the PCB.

Further, in the invention disclosed in Japanese Patent Application Laid-Open No. Sho 62-117050, a layered protocol stack such as TCP/IP is subjected to pipeline processing by plural processors. This is advantageous for increasing speed, however, it is necessary to configure the processing not to break down the pipeline processing.

It is expected to combine the both techniques and drastically speed up the protocol stack processing. However, in the conventional art, when a caching failure occurs upon access to a PCB, cache update is performed on demand, the pipeline processing is broken down. The caching failure frequently occurs when the cache size of the PCB is small in comparison with the number of connections. Further, in a built-in system, as the cache size of the PCB cannot be increased from the point of cost.

Further, in the HTTP server on the above-described built-in device, sequential arrival of communication packets in different connections is conceivable. Even in a system where PCBs are held in a high-speed accessible internal memory or cache memory for the purpose of speed-up of access to the PCBs, the PCBs are frequently replaced in the above situation. Accordingly, the advantage of caching of the PCB is lost, and the performance is seriously lowered.

Further, the frequent replacement of the PCBs bears upon the band of a data bus or the like in the built-in device, which reduces the performances of other services in the built-in device, and by extension, lowers the entire performance of the built-in device.

Further, in SSL/TLS communication, it is necessary to identify plural sessions and obtain PCBs for the sessions. The session corresponds to connection in TCP communication. Also, in the SSL/TLS communication, similar problems to those in the HTTP server occur.

SUMMARY OF THE INVENTION

The present invention has an object to efficiently perform the pipeline processing.

Accordingly, the present invention provides a communication apparatus comprising: a plurality of processing units to perform pipeline processing on communication data; and first and second memory units, wherein a first processing unit among the plurality of processing units transfers information, used by a second processing unit to perform post-stage processing of the first processing unit, from the first memory unit to the second memory unit.

Further, the present invention provides an information transfer method in a communication apparatus having a plurality of processors to perform pipeline processing on communication data, for transferring information by a first processor among the plurality of processors from a first memory to a second memory, comprising the steps of: reading information used by a second processor to perform post-stage processing of the first processor from the first memory; and writing the information into the second memory.

Further features of the present invention will become apparent from the following description of exemplary embodiments with reference to the attached drawings.

BRIEF DESCRIPTION OF THE DRAWINGS

FIG. 4 is a sample showing extracts of respective elements included in a TCPCB;

FIGS. 8A and 8B are a flowcharts showing the operation of the PCB controller when a TCPCB acquisition request is issued from the sub processor to the PCB controller;

DESCRIPTION OF THE EMBODIMENTS

Hereinbelow, an exemplary embodiment to which the present invention is applied will be described in detail with reference to the attached drawings.

Figure 1:
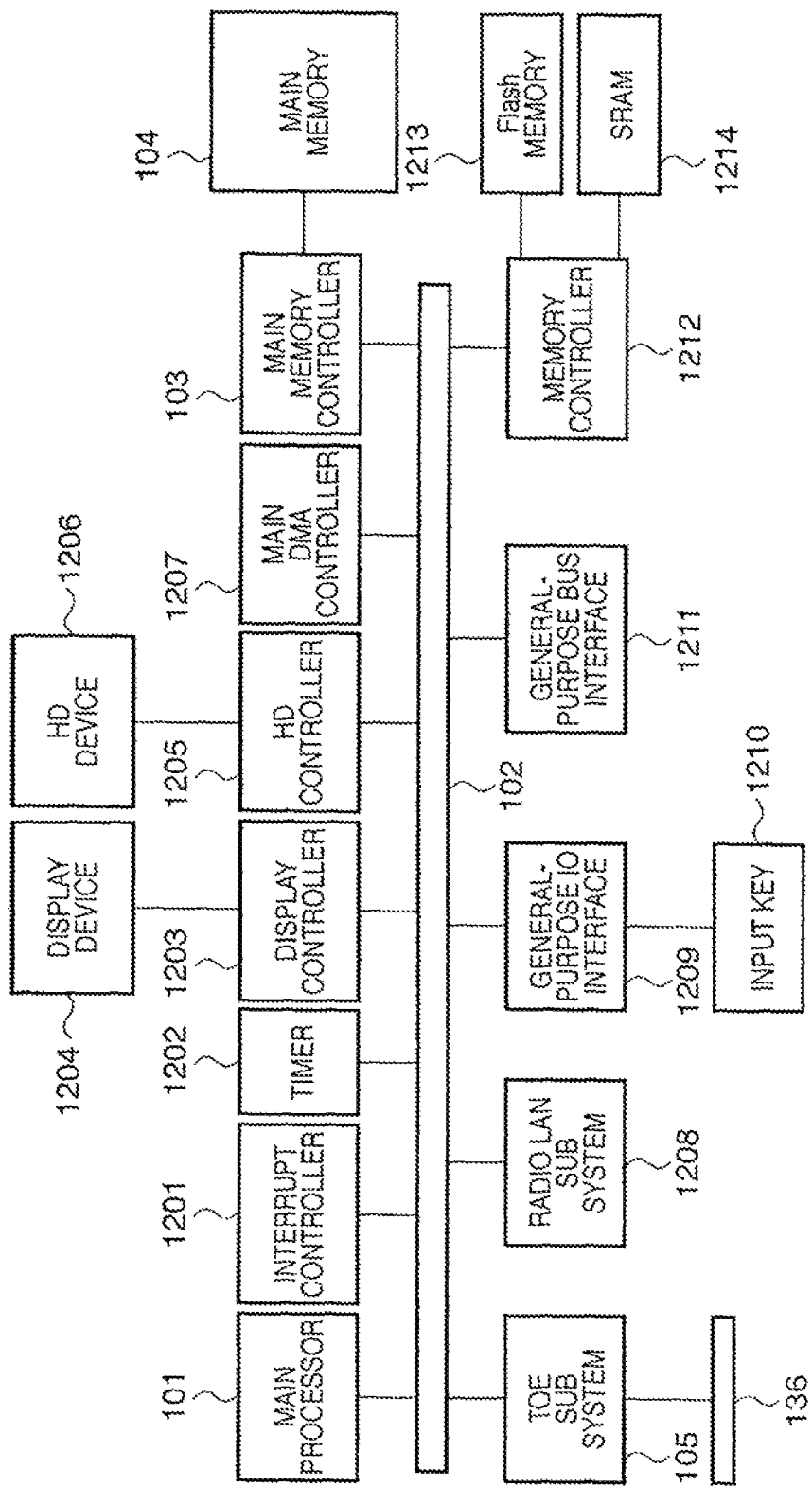
FIG. 1 is a block diagram showing the configuration of a communication apparatus according to an embodiment of the present invention.

FIG. 1 is a block diagram showing the configuration of a communication apparatus according to the embodiment of the present invention.

An HD (Hard Disk) device 1206 is connected via an HD controller 1205 to a system bus 102. The HD device 1206 holds software to realize functions of the communication apparatus and its related data, firmware to operate in sub processors in respective sub systems and a sequencer, microcode and its related data, and historical information. Note that the historical information includes communication data, an operation history and a communication history of the communication apparatus, and the like.

The software stored in the HD device 1206 includes application software to realize respective functions of the communication apparatus, a device driver to control an application protocol and its related hardware and OS (Operating System).

A Flash memory 1213 and an SKAM 1214, which are rewritable nonvolatile memories, are connected via a memory controller 1212 to the system bus 102. The Flash memory 1213 holds a boot program which operates upon starting of the communication apparatus, parameters necessary for initial setting of the communication apparatus, a device driver to control the respective hardware upon starting of the communication apparatus and setting parameters upon starting of the respective hardware, and the like.

A main processor 101 of the communication apparatus executes the boot program in the Flash memory 1213, and initializes the respective hardware and sub systems in the communication apparatus. Then, the main processor 101 loads the software stored in the HD device 1206 to the main memory 104, to start the OS included in the software. Further, the respective firmware executed by the respective sub processors included in a TOE sub system 105 are also loaded on the main memory 104, and the respective sub processors are started.

The communication apparatus has an interrupt controller 1201, a timer 1202, an input key 1210, a display device 1204 and a radio LAN sub system 1208. The interrupt controller 1201 transmits an interrupt event from the respective hardware and the sub systems to the main processor 101. The timer 1202 which is started by software or the like, causes time measurement or a time-out event. The input key 1210 is connected via a general-purpose IO interface 1209 to the system bus 102. The input key 1210 is used for setting of operation modes of the communication apparatus and input of respective communication parameters represented by an IP (Internet Protocol) address. The display device 1204 displays statuses of the communication apparatus, the contents of the settings and the like under the control of the display controller 1203. The radio LAN sub system 1208 is used for connection to a radio LAN in conformance with the IEEE 802.11 Ma/b/g/n standard. A main DMA controller 1207 controls data transfer between storage devices connected to the system bus 102, e.g., between the main memory 104 and the TOE sub system 105.

Note that the TOE sub system 105 and the system bus 102 may be connected to each other via a general-purpose bus interface 1211 (e.g., a PCI bus formulated by the PCI-SIG as a de facto standard general-purpose bus). Note that the PCI SIG is abbreviation of the PCI Special Interest Group, and PCI, abbreviation of Peripheral Component Interconnect.

Figure 2:
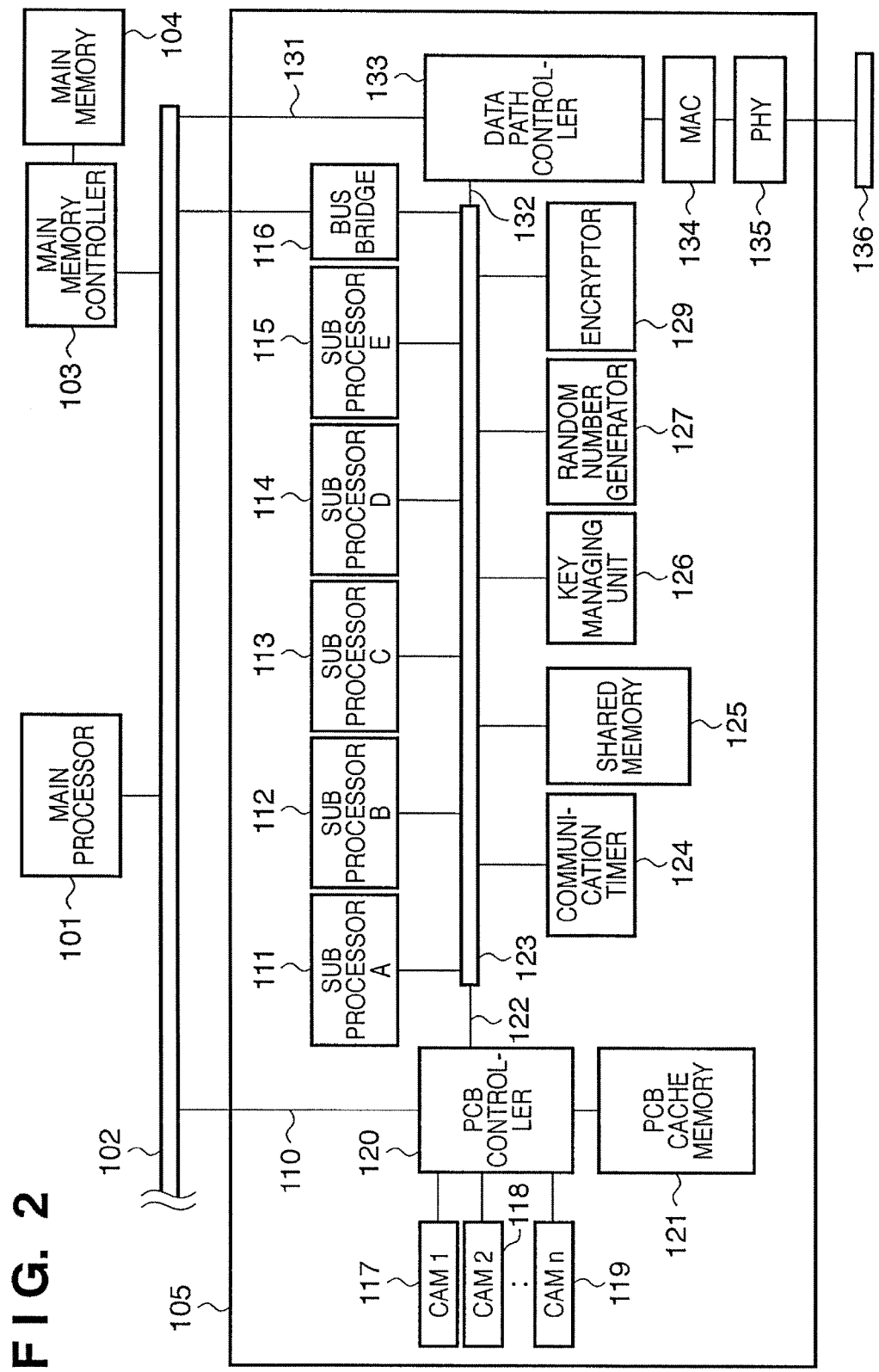
FIG. 2 is a block diagram showing the configuration of a TOE sub system according to the embodiment in detail.

FIG. 2 is a block diagram showing the configuration of the TOE sub system 105 according to the present embodiment in detail.

As shown in FIG. 2, the TOE sub system 105 is connected to the system bus 102 of the communication apparatus. The system bus 102 is an on-chip bus having a crossbar switch structure represented by AMBA 3.0 AXI (Advanced extensible Interface) specification proposed by ARM Ltd. The on-chip bus is capable of parallel transfer operation for transmitted/received data required in the communication apparatus. The communication apparatus is connected to the Ethernet 136 with a PHY (Physical Layer Chip) 135 in the TOE sub system 105.

The TOE sub system 105 including a sub system bus 123 is connected via a bus bridge 116 to the system bus 102. The sub system bus 123 is a crossbar switching bus.

The TOE sub system 105 has five sub processors 111 to 115 to perform TCP/IP protocol processing off-loaded from the main processor 101.

The sub processors 111 to 115 are connected to the sub system bus 123. The respective bus processors 111 to 115 load the respective firmware programs loaded on the main memory 104 to their respective internal instruction cache memories and execute the firmware programs.

Further, the TOE sub system 105 has a shared memory 125 for communication and information sharing among the five sub processors 111 to 115, and a communication timer 124 to perform time measurement and a time-out event necessary for TCP/IP protocol processing.

Further, the TOE sub system 105 has the PHY 135 and a MAC (Media Access Control) 134 for connection to the Ethernet 136. The PHY 135 is hardware to handle protocol processing and electric signals in a PHY (physical) layer 307 positioned as the first layer of the OSI (Open System Interconnection) reference model. The MAC 134 is hardware to process a protocol in a MAC layer 306 (see FIG. 3) corresponding to a lower sub layer of the data link layer (the second layer) of the OSI reference model.

A data path controller 133 has a reception buffer memory, a reception buffer memory controller, a transmission buffer memory, a transmission buffer memory controller, a first DMA control unit, a checksum calculator, and a second DMA control unit (all not shown).

The reception buffer memory of the data path controller 133 temporarily holds a received frame processed by the MAC 134. The reception buffer memory controller of the data path controller 133 enables the respective sub processors 111 to 115 to refer to protocol headers of the respective layers in the received frame held in the reception buffer memory via the sub system bus 123. The transmission buffer memory of the data path controller 133 temporarily holds transmit data.

The first DMA control unit of the data path controller 133 controls data transfer between the reception buffer memory/ the transmission buffer memory and a storage device connected to the system bus 102, e.g., the main memory 104, via the bus 131 and the system bus 102. The checksum calculator of the data path controller 133 performs checksum calculation during DMA processing. The second DMA control unit of the data path controller 133 controls data transfer between the reception buffer memory/the transmission buffer memory and the MAC 134.

Further, the TOE sub system 105 has an encryptor 129 for cipher communication protocol processing such as IPsec or SSL/TLS. As the encryptor 129, the AES encryptor selected by National Institute of Standards and Technology (NIST), the SHA-1 Hush function used in authentication or digital signature, and the like, may be employed. In addition, the MD5 (Message Digest 5) Hush function standardized by the Internet Engineering Task Force (IETF) as the RFC-1321 and the like may be employed. Note that "AES" is abbreviation of Advanced Encryption Standard; and "SHA-1", abbreviation of Secure Hash Algorithm 1.

Further, the TOE sub system 105 has a key managing unit 126 to hold an encryption key, a random number or a prime number generated for the cipher communication protocol processing for preservation of confidentiality, and a random number generator 127 for the TCP/IP protocol processing and the cipher communication protocol processing.

Figure 3:
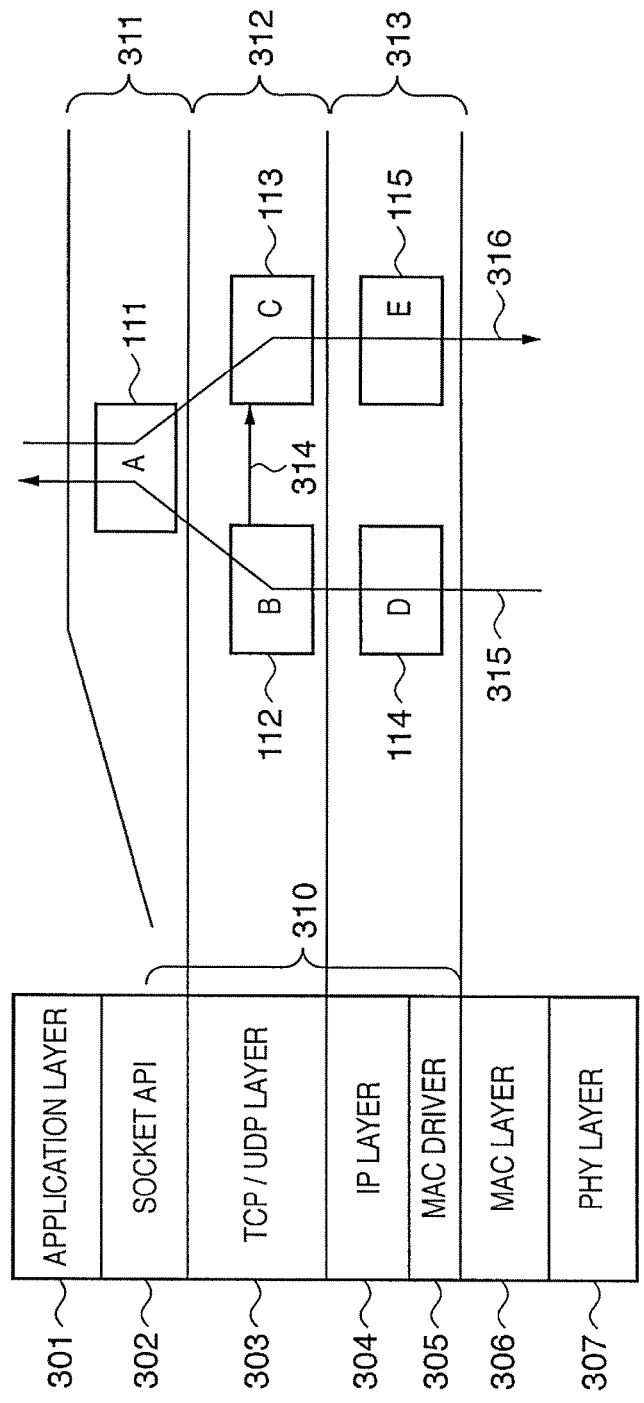
FIG. 3 is an explanatory view for explanation of roles of respective sub processors in the TOE sub system.

Next, the roles of the respective sub processors 111 to 115 of the TOE sub system 105 will be described with reference to FIG. 3.

The processing functions of the TOE sub system 105 cover a part (in a range 310 in FIG. 3) of the functions of a MAC driver 305, an Internet layer (IP layer) 304, a transport layer (TCP/UDP layer) 303 and a socket API 302. The MAC driver 305 exchanges communication data with communication information from the MAC layer 306. The Internet layer 304 processes the IP protocol. The transport layer 303 processes the TCP/UDP protocol. These functions are mainly used for selecting a protocol and relaying data transmission/reception and information transmission.

The above functions are performed by the respective sub processors. For example, a part of the processing in the socket API 302 is performed by the sub processor A 111. Further, in the TCP/UDP protocol processing in the transport layer 303, processing related to a reception operation is performed by the sub processor B 112. Further, in the TCP/UDP protocol processing, processing related to a transmission operation is performed by the sub processor C 113. Further, in the MAC driver 305 and the IP protocol processing by the IP layer 304, processing related to the reception operation is performed by the sub processor D 114. In the MAC driver 305 and the IP protocol processing, processing related to the transmission operation is performed by the sub processor E 115. In this manner, the above functions are allocated to the respective sub processors.

The allocation is made for the purpose of dividing the series of protocol processing into three pipeline stages 311 to 313 and realizing a pipeline operation. Further, as the transmission operation and the reception operation are separated, the sub processors in charge of these functions operate in parallel to each other. In the TCP protocol, to ensure arrival of transfer data, arrival acknowledgment information, called an "acknowledgment response", is transmitted from the data receiving side to the transmitting side between connections. To perform the acknowledgment response processing, arrival acknowledgement information transmission 314 is required between the sub processor B 112 and the sub processor C 113. The information transmission and information sharing, the information transmission and information sharing between the pipeline stages, the information transmission and information sharing between the respective sub processors 111 to 115 constituting the pipeline stages and the main processor 101, are performed via the shared memory 125. Further, these information transmission and information sharing may be performed by using the main memory 104.

The TOE sub system 105 manages context information used upon processing of the respective communication protocols as PCBs. The PCBs can be referred to and rewritten in short time from the respective sub processors 111 to 115. To realize the reference and rewriting, the TOE sub system 105 has a PCB cache memory 121 for temporary storage of the PCBs, and a PCB controller 120 for generation and deletion of PCBs, control of access to the PCBs, and storage and management of the PCBs. The PCB cache memory 121 is high-speed accessible from the main memory 104.

Further, the TOE sub system 105 has a CAM (Content Addressable Memory) 1 (117), a CAM 2 (118), . . . , a CAM n (119). For example, the CAM 1 (117) is used for a search to specify a PCB (socket number) with information read by the PCB controller 120 from a received frame as a search key (socket information). The CAM 2 (118) is used for determining whether or not a PCB with a desired socket number exists on the PCB cache memory 121.

The PCB is also referred to as a TCPCB (protocol control information) in TCP processing. FIG. 4 shows extracts of respective elements included in the TCPCB. In FIG. 4, a parameter which begins with a prefix snd_ is a transmission parameter; and a parameter which begins with rcv_, a reception parameter. Note that although not shown in FIG. 4, there are many other elements such as a transmission destination IP address, a transmission destination port number, a transmission originator IP address, and a transmission originator port number. Further, the size of the TCPCB is about 2 Kbits per one connection.

Figure 5A:
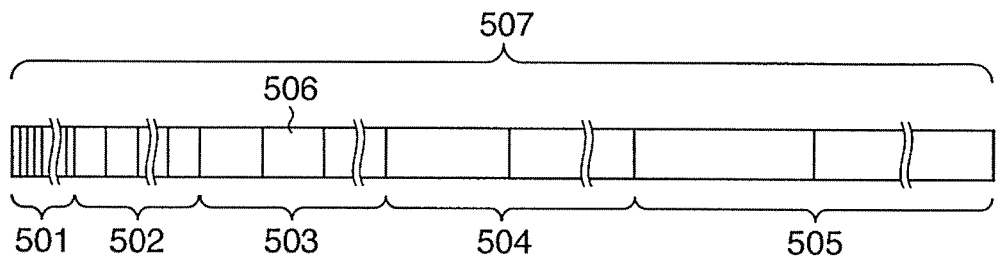
FIG. 5A is a table showing the structure of the TCPCB.

As shown in FIG. 5A, in the TCP/IP protocol processing, a TCPCB 507 has a 1-bit element 501, a 4-bit element 502, an 8-bit element 503, . . . . Thus, the respective elements are contracted based on classification 501 to 505 for respective sizes.

The respective elements are normalized in correspondence with any one of these sizes. Further, the segmentation by size is logical segmentation identified by the TOE firmware. The respective sizes, the number of elements and the order of the elements can be re-defined by description in a header file, given upon compilation of the TOE firmware, in which the various parameters are contracted.

Figure 5B:
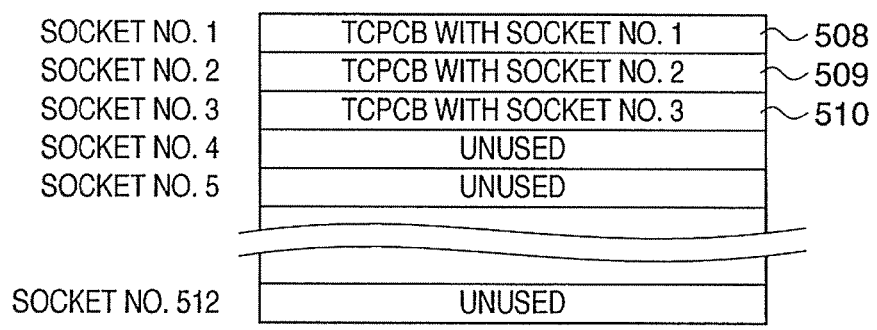
FIGS. 5B and 5C are tables showing an example of storage of the TCPCB.

Further, as shown in FIG. 5B, TCPCBs 508 to 510 held on the main memory 104 are arrayed in the order of socket number for identification of TCP connection.

In the TCP/IP protocol processing, the TCPCB is accessed from the sub processor A 111, the sub processor B 112, and the sub processor C 113. To smoothly perform the access, at the timing of access from the respective sub processors 111 to 113, the respective TCPCB are duplicated on the PCB cache memory 121.

Figure 5C:
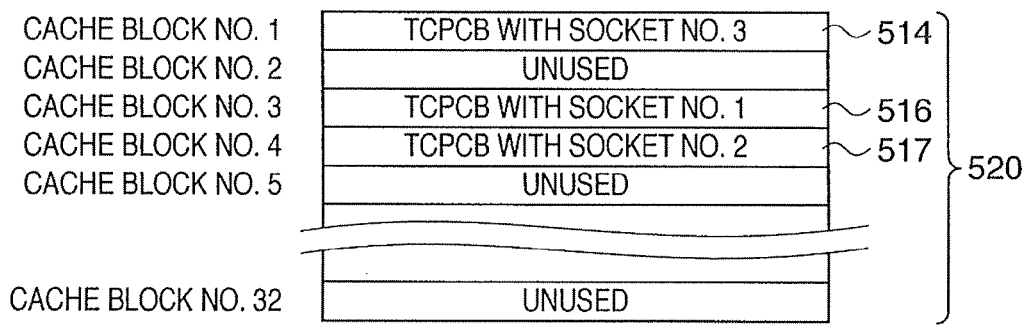

FIG. 5C shows an example of arrangement of the respective TCPCBs on the PCB cache memory 121. The accessed TCPCBs 514, 516 and 517 are duplicated in a cache block (recording area) group 520 on the PCB cache memory 121. Note that in the case of TCPCB generated for a new TCP connection, the TCPCB may exist on the PCB cache memory 121 and not saved on the main memory 104. Note that TCPCB transfer between the PCB cache memory 121 and the main memory 104 such as saving is performed by the PCB controller 120 (more specifically, by the DMA controller 205 under instruction from the PCB control sequencer 203 as described later with reference to FIG. 6).

Figure 6:
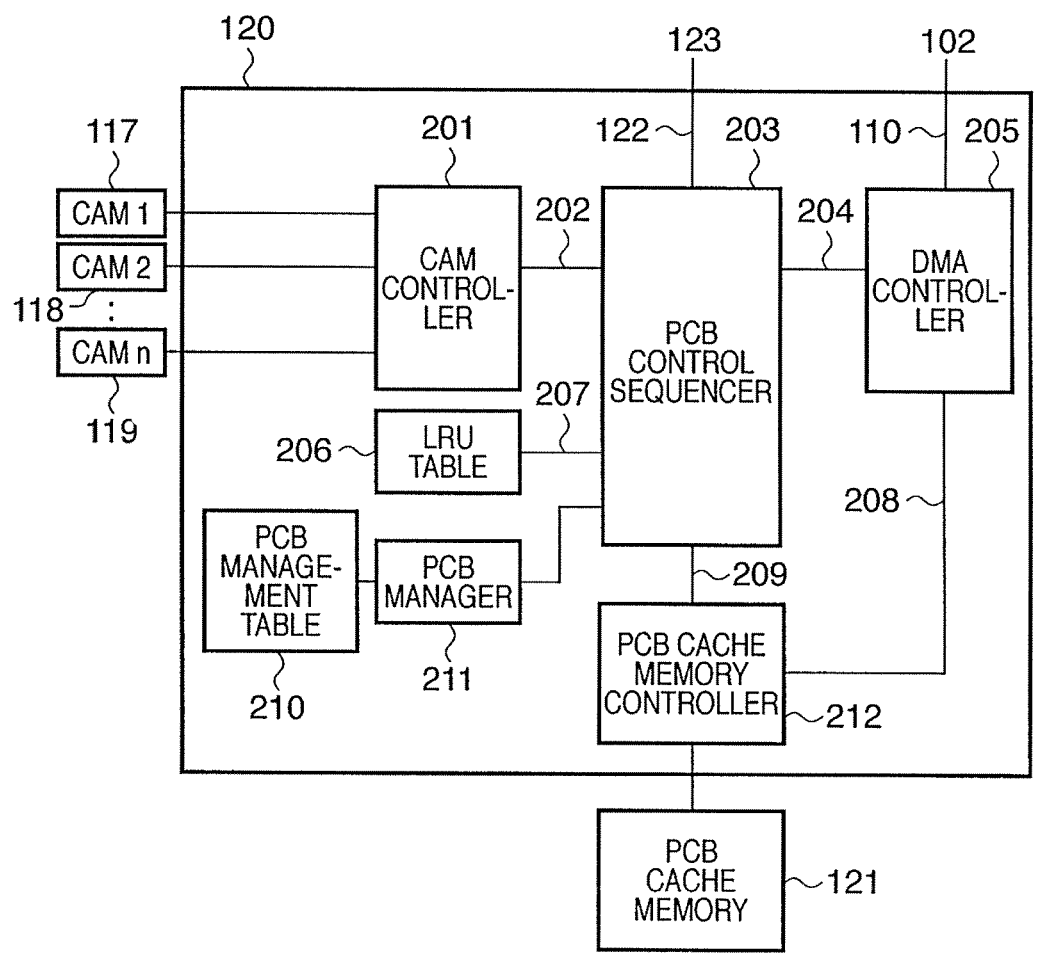
FIG. 6 is a block diagram showing a configuration of a PCB controller in detail.

FIG. 6 is a block diagram showing the configuration of the PCB controller 120 in detail.

In the PCB controller 120 shown in FIG. 6, the PCB control sequencer 203 is connected via a bus 122 to the sub system bus 123. The PCB control sequencer 203 performs data transmission/reception with the respective elements in the TOE sub system 105, and controls the respective elements in the PCB controller 120. The main processor 101 loads a microcode to an instruction cache memory of the PCB control sequencer 203, and the PCB control sequencer 203 executes the microcode, thereby processing operations shown in FIGS. 7 to 9 to be described later are realized. In the present embodiment, the PCB control sequencer 203 is a programmable sequencer, however, to perform the processing operation at a higher speed, the PCB control sequencer 203 may be finite state machine (specialized machine) hardware.

A CAM controller 201 performs writing/reading of various data to/from the CAM 1 (117) to the CAM n (119), in accordance with an instruction from the PCB control sequencer 203 connected via a bus 202. Further, the DMA controller 205 controls TCPCB transfer between the PCB cache memory 121 and the main memory 104 via the buses 110 and 208, and the system bus 102, in accordance with an instruction from the PCB control sequencer 203 connected via a bus 204.

An LRU table 206, connected to the PCB control sequencer 203 via a bus 207, is a table for management of a used cache block, a block from which saving of data is prohibited, and the like. Note that the PCB control sequencer 203 manages a last access or the like to a cache block using the LRU table 206.

The PCB manager 211 uses a PCB management table 210 for management regarding socket number such as use/non-use of socket number. Further, the PCB cache memory controller 212, connected via buses 209 and 208 to the PCB control sequencer 203 and the DMA controller 205, controls writing/reading of various data to/from the PCB cache memory 121, based on instructions from the PCB control sequencer 203 and the DMA controller 205.

Figure 9:
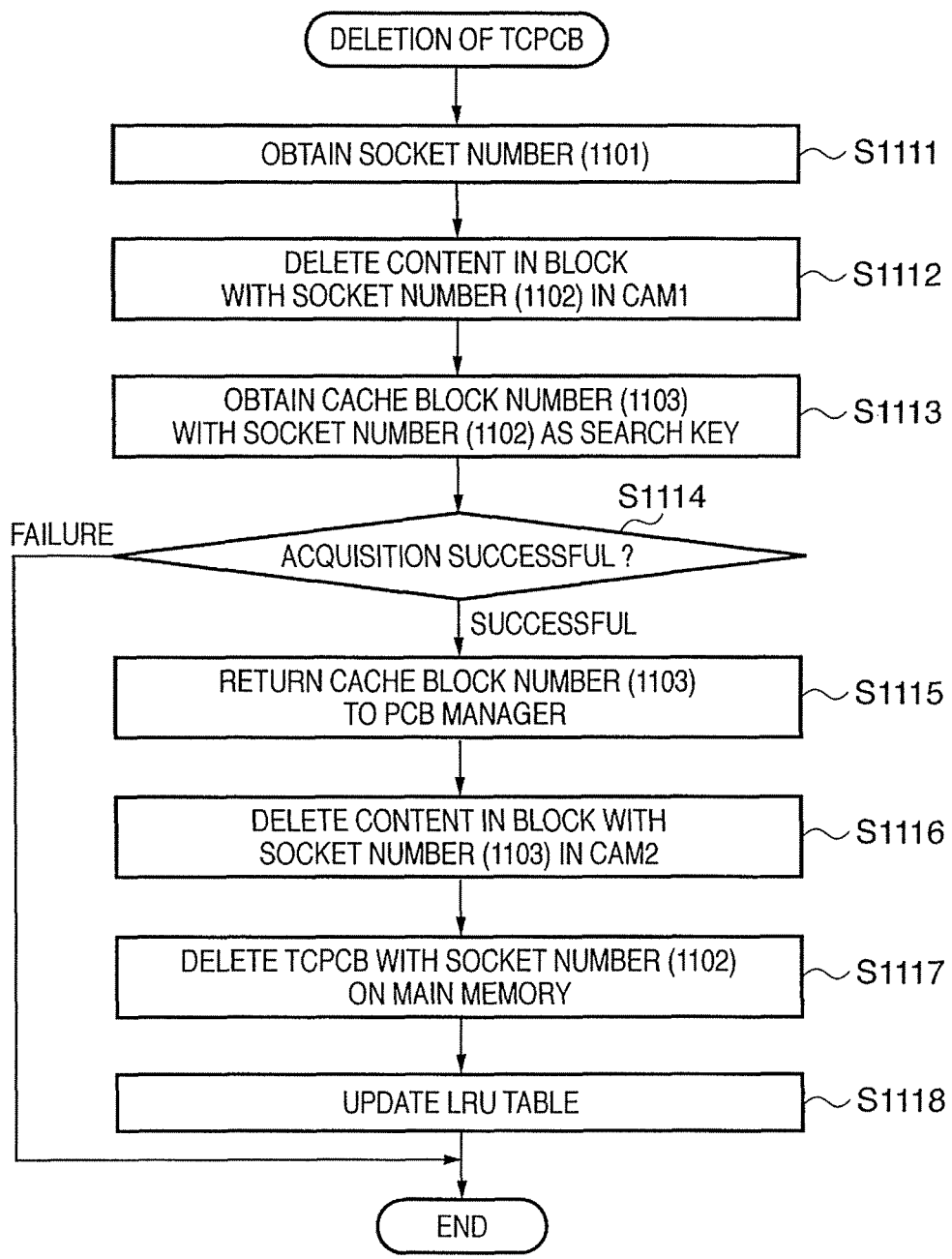
FIG. 9 is a flowchart showing the operation of the PCB controller when a TCPCB deletion request is issued from the sub processor to the PCB controller.

Next, the TCP/IP protocol processing in the TOE sub system 105 will be described with reference to the flowcharts of FIGS. 7 to 9 and other appropriate figures. Note that the processings shown in FIGS. 7 to 9 are realized by executing the microcode stored in the internal instruction cache memory of the PCB control sequencer 203 by the PCB control sequencer 203.

Figure 7A:
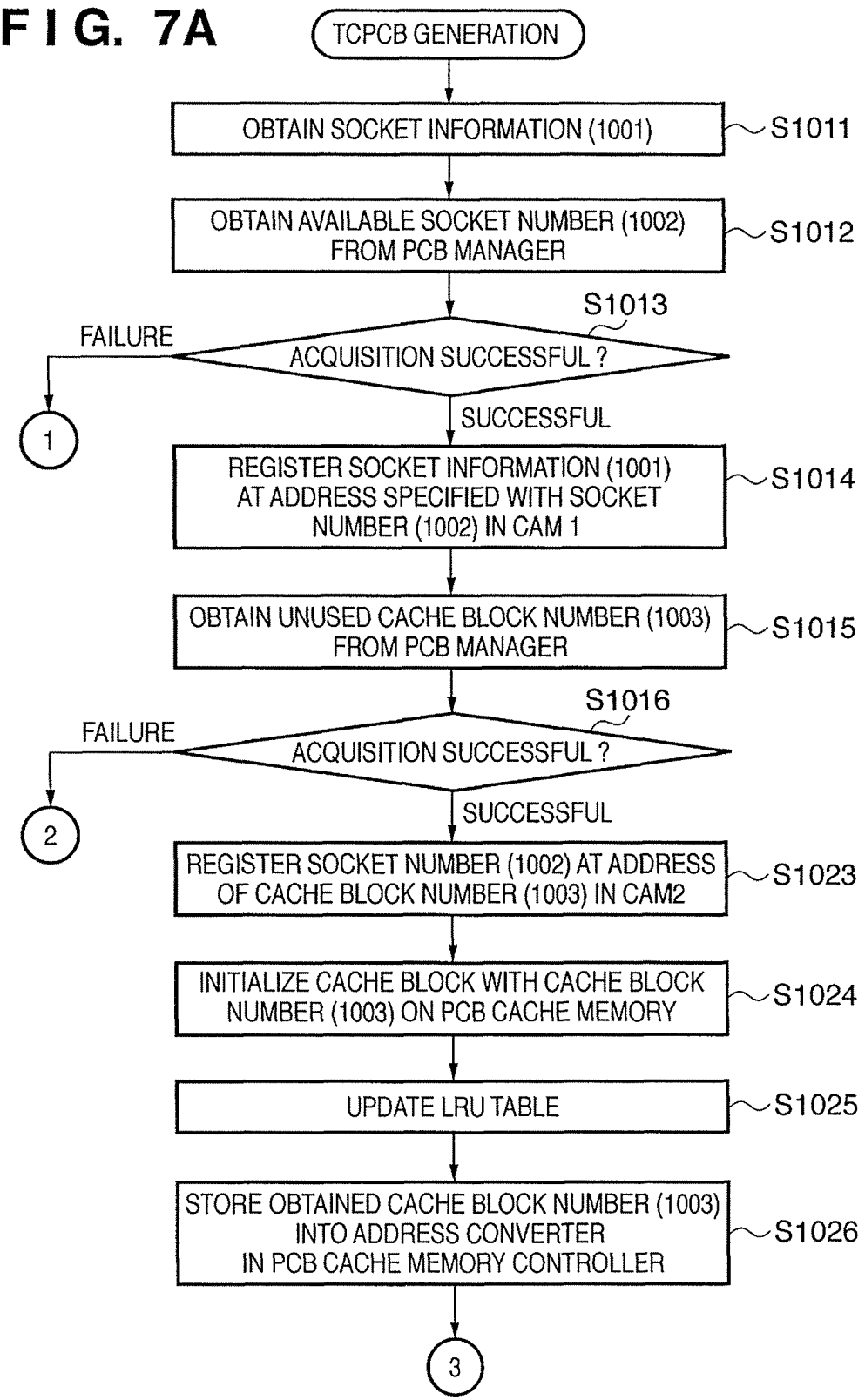
FIGS. 7A AND 7B are a flowcharts showing the flow of processing by the PCB controller upon generation of the TCPCB.
Figure 7B:
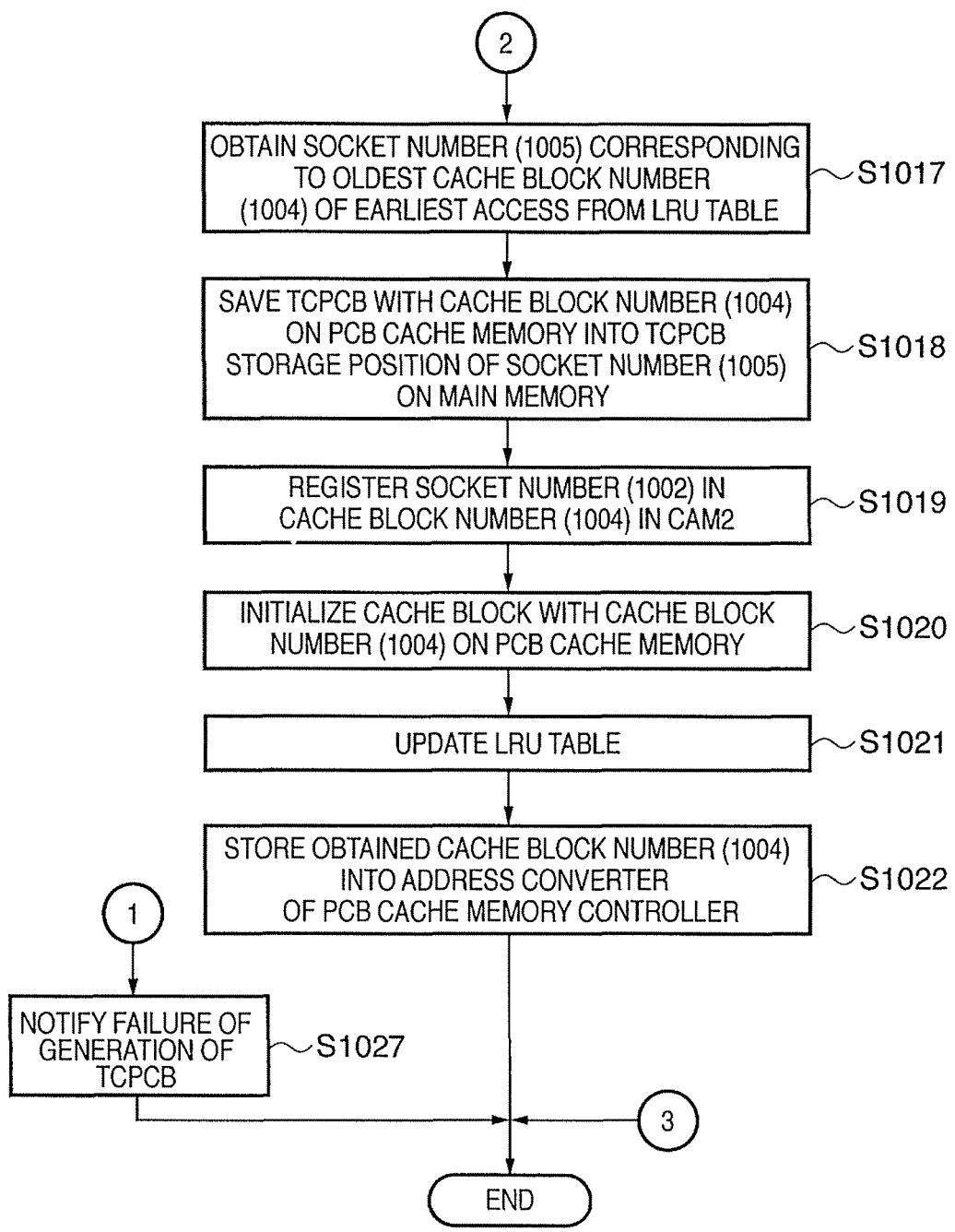

FIGS. 7A and 7B are flowcharts showing the flow of processing by the PCB controller 120 upon generation of TCPCB. Note that the TCPCB is generated upon establishment of TCP connection.

The TCP connection is established by the sub processor A 111, and information on a socket pair is obtained from information exchanged upon establishment of the connection. The sub processor A 111 performs a part of processing in the socket API 302 (FIG. 3). In the present embodiment, the information on the socket pair, i.e., the combination of a transmission destination IP address, a transmission destination port number, a transmission originator IP address and a transmission originator port number is referred to as socket information. The socket information is identification information for identifying a protocol communication channel with a combination of the above four informations. A TCP header of each TCP packet transmitted/received after connection establishment includes socket information.

In step S1011, the PCB control sequencer 203 receives an instruction of TCPCB generation from the sub processor A 111, and at this time, receives socket information (a transmission destination IP address, a transmission destination port number, a transmission originator IP address and a transmission originator port number) and the like from the sub processor A 111. The socket information will be referred to as "socket information 1001" here. The PCB control sequencer 203 generates a TCPCB based on the socket information and the like.

In step S1012, the PCB control sequencer 203 obtains an unused socket number from the PCB manager 211. The obtained unused socket number will be referred to as "socket number 1002" here. In the present embodiment, a unique socket number is allocated for identification of a socket pair from a series of numbers as socket numbers. The PCB manager 211 manages unused socket numbers. The PCB manager 211 issues an unused socket number in accordance with an acquisition request from the PCB control sequencer 203.

Figure 10A:
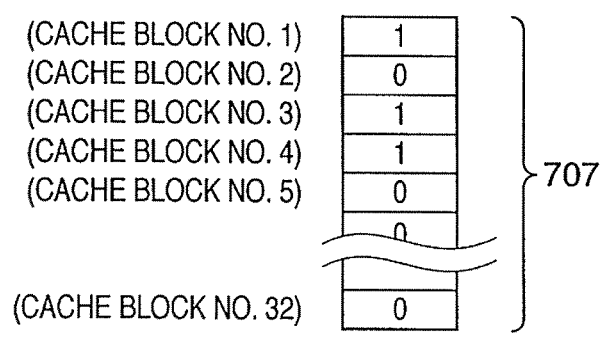
FIGS. 10A and 10B are tables showing the structure of a PCB management table.
Figure 10B:
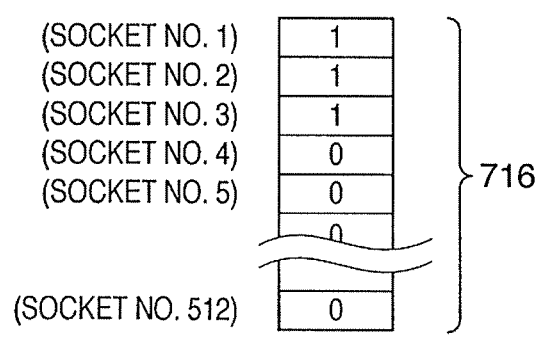

As shown in FIG. 10B, the PCB manager 211 manages the socket numbers in a bitmap 716 indicating used/unused states of socket numbers formed on a PCB management table 210. When an unused socket number is requested from the PCB control sequencer 203, the PCB manager 211 notifies the PCB control sequencer 203 of an unused socket number which has been previously obtained by searching the bitmap 716. In addition to this notification, the PCB management table 210 is updated and the next unused socket number is obtained as background operations.

Further, upon release of the connection, the used socket number is returned from the sub processor A 111 via the PCB control sequencer 203 to the PCB manager 211. When the used socket number has been returned, the PCB manager 211 updates the PCB management table 210 and performs a search for an unused socket number.

In step S1013, when the acquisition of socket number has been successful, the process proceeds to step S1014, whereas when the acquisition of socket number has failed, the process proceeds to step S1027.

Note that when data as a search key corresponds with data registered in the CAMs, the CAM controller 201 reports address information on a location in which the data is stored as the result of the search. When the search key corresponds with no data, the CAM controller 201 reports the failure of the search to the PCB control sequencer 203. Further, when the search key corresponds with plural same data in the CAMs, all the addresses are reported. However, in the present embodiment, such same plural data do not exist.

Figure 11A:
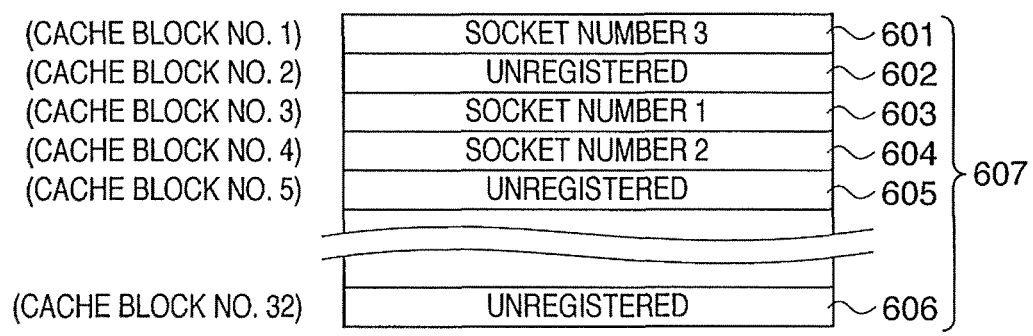
FIGS. 11A and 11B are tables showing examples of data structures in a CAM2 and a CAM1.
Figure 11B:
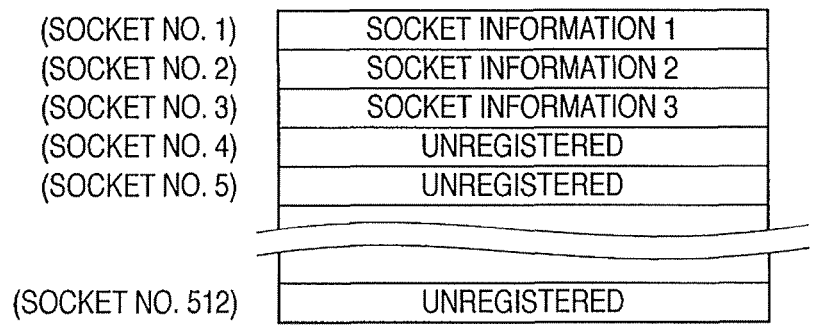

In step S1014, the socket information is registered in the CAM 1 (117) in the form as shown in FIG. 11B. That is, the PCB control sequencer 203 instructs the CAM controller 201 to register the socket information (the transmission destination IP address, the transmission destination port number, the transmission originator IP address and the transmission originator port number) 1001, obtained at step S1011, at the address indicated with the socket number obtained at step S1012. The CAM controller 201 registers the socket information 1001 at the address.

In step S1015, the PCB control sequencer 203 obtains an unused cache block number from the PCB manager 211 as preparation for generation of TCPCB on the PCB cache memory 121. The obtained unused cache block number will be referred to as a "cache block number 1003" here. As shown in FIG. 10A, the presence/absence of cache block number is managed in a bitmap 707 indicating used/unused states of cache block numbers formed on the PCB management table 210 as in the case of the socket numbers.

In step S1016, when there is no unused cache block number and the acquisition of unused cache block number has failed, the process proceeds to step S1017, whereas the acquisition of unused cache block number has been successful, the process proceeds to step S1023.

In steps S1017 and S1018, to generate a new cache block on the PCB cache memory 121, an old cache block in which a use flag and save lock flag are not set is saved into the main memory 104, so as to obtain an available area. The use flag indicates that any one of the sub processors 111 to 113 uses the cache block. The save lock flag indicates prohibition of saving thereby indicates that deletion of the cache block from the PCB cache memory 121 is disabled.

In step S1017, the PCB control sequencer 203 obtains a socket number corresponding to a cache block number of the earliest access regarding which the use flag and the save lock flag are not set, from the LRU table 206. The obtained cache block number will be referred to as a "cache block number 1004" and the corresponding socket number will be referred to as a "socket number 1005" here.

Figure 12A:
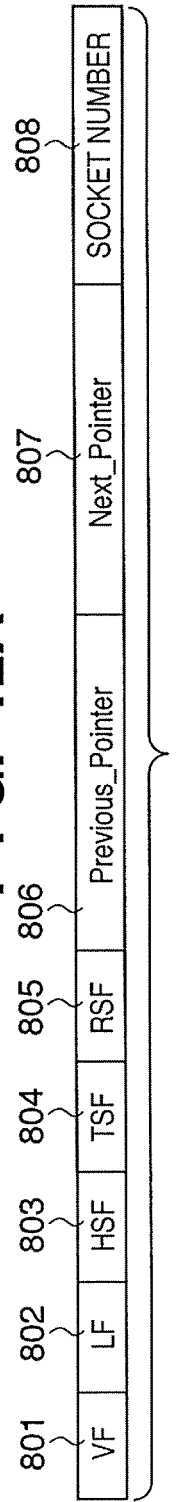
FIG. 12A is a table showing an example of the format of data stored in an LRU table 206.
Figure 12B:
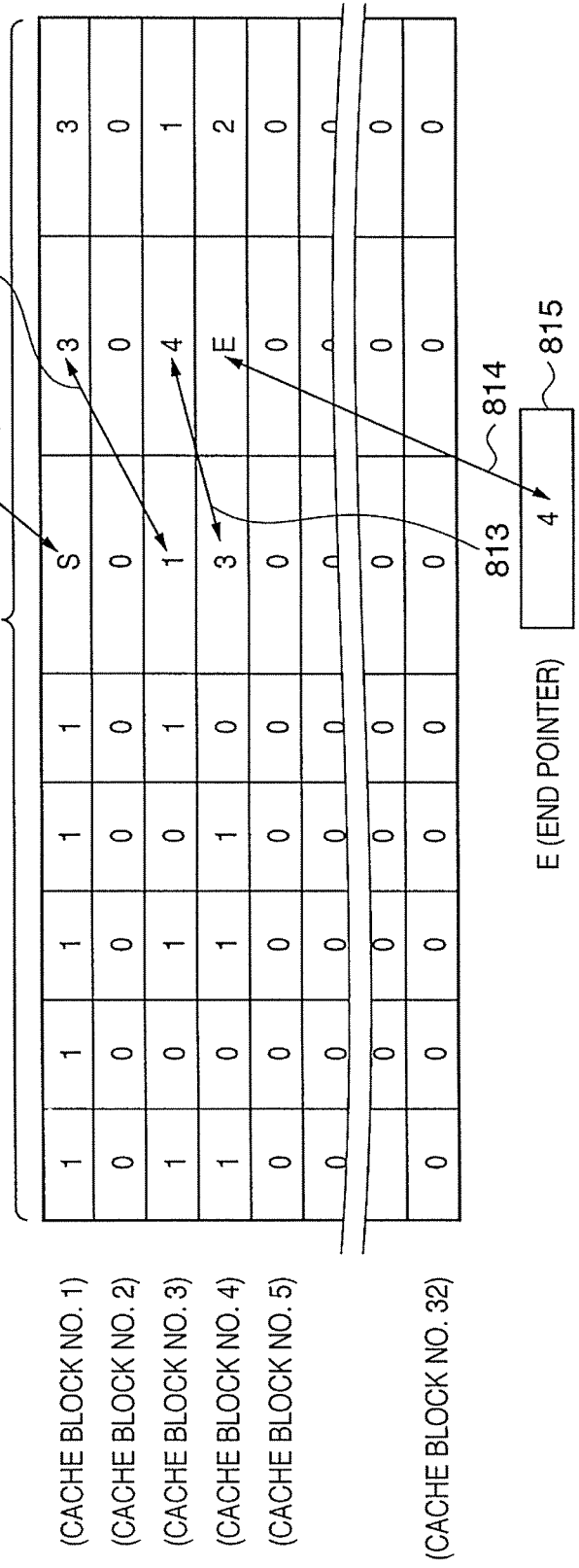
FIG. 12B is a table showing an example of data structure stored in the LRU table.

FIG. 12A shows the format of data stored in the LRU table 206. FIG. 12B shows an example of structure of the data stored in the LRU table 206 in the data format shown in FIG. 12A.

In the LRU table 206, valid cache blocks are connected using two pointer informations held in the PCB control sequencer 203, i.e., a head pointer 810 and an end pointer 815.

In the connected respective cache blocks, connection states 811 to 814 are indicated with two pointer informations, Previous_Pointer 806 and Next_Pointer 807. The head pointer 810 indicates a head cache block of the connection, and the end pointer 815, the end cache block of the connection. A newly generated cache block is connected in front of the end pointer 815, and the oldest cache block is indicated with the head pointer 810. In FIG. 12B, the head pointer 810 indicates a cache block number 1, and the Next_Pointer 807 in the cache block number 1 indicates a cache block number 3. Further, the Previous_Pointer 806 in a cache block number 4 indicates the cache block number 3, and the Next_Pointer 807 in the cache block number 4 indicates the end pointer 815.

Further, an arbitrary cache block can be disconnected by operating the Previous_Pointer 806 and the Next_Pointer 807 in the cache block to be disconnected and its previous and next cache blocks. At this time, the head pointer 810 functions as the Next_Pointer 807, and the end pointer 815 functions as the Previous_Pointer 806.

In addition to these pointers 806 and 807, a flag 801, a save lock flag 802, use flags 803 to 805 and corresponding socket number 808 are stored in the LRU table 206. The flag 801 indicates that a corresponding cache block is valid. The save lock flag 802 indicates prohibition of saving from the PCB cache memory 121. The use flags 803 to 805 respectively indicate one of the sub processors 111 to 113 using the corresponding cache block.

The update operation of the LUR table 206 such as registration, deletion or the like by the PCB control sequencer 203 is performed by referring to or rewriting the above-described pointers and the flags.

In step S1018, the DMA controller 205 saves the TCPCB deleted from the PCB cache memory 121 into the main memory 104. More particularly, the TCPCB stored in the position of the cache block number 1004 on the PCB cache memory 121 is saved in the position of the socket number 1005 in the TCPCBs 508 to 510 on the main memory 104.

In step S1019, the PCB control sequencer 203 instructs the CAM controller 201 to register the socket number 1002 at the address of the cache block number 1004 in the CAM 2 (118). In accordance with the instruction, the CAM controller 201 registers the socket number 1002 at the address of the cache block number 1004 in the CAM 2 (118).

FIG. 11A shows an example of data storage in the CAM 2 (118). The CAM 2 (118) has the same structure as that of the CAM 1 (117). When a search is performed with a socket number as a search key, the CAM 2 reports an obtained cache block number corresponding to the socket number. The registration of the socket number in the CAM 2 (118) is made by designating a cache block number as an address.

In step S1020, the PCB control sequencer 203 instructs the PCB cache memory controller 212 to initialize the cache block with cache block number 1004 on the PCB cache memory 121. In accordance with the instruction, the PCB cache memory controller 212 initializes the cache block with cache block number 1004 on the PCB cache memory 121.

In step S1021, the PCB control sequencer 203 updates the LRU table 206 in correspondence with the initialization of the cache block. In the update, the cache block with cache block number 1004 is connected in front of the end pointer 815. By this processing, the order of saving of the cache block with cache block number 1004 in the main memory 104 can be retarded.

In step S1022, the PCB control sequencer 203 stores the cache block number 1004, with the socket number 1002 obtained at step S1012, in an address converter 1303 (FIG. 13) in the PCB cache memory controller 212. Thereafter, the TCPCB is registered at the address of the cache block number 1004 in the PCB cache memory 121.

Figure 13:
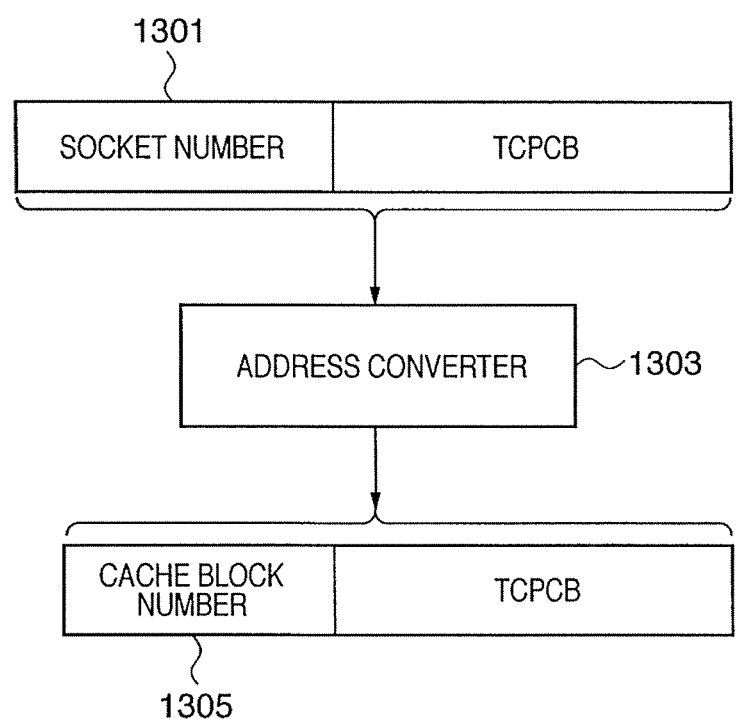
FIG. 13 is an explanatory view of an address converter.

As shown in FIG. 13, the address converter 1303 converts an address 1301 of the socket number 1002 requested from the PCB control sequencer 203 and the DMA controller 205 to an address 1305 of the cache block number 1004 in the PCB cache memory 121.

On the other hand, at step S1023, the PCB control sequencer 203 instructs the CAM controller 201 to register the socket number 1002 at the address of the cache block number 1003 in the CAM 2 (118). In accordance with the instruction, the CAM controller 201 registers the socket number 1002 at the address of the cache block number 1003 in the CAM 2 (118).

In step S1024, the PCB control sequencer 203 instructs the PCB cache memory controller 212 to initialize the cache block with the cache block number 1003 on the PCB cache memory 121. In accordance with the instruction, the PCB cache memory controller 212 initializes the cache block with the cache block number 1003 on the PCB cache memory 121.

In step S1025, the PCB control sequencer 203 updates the LRU table 206 in correspondence with the above initialization of the cache block. The cache block with the cache block number 1003 is added in front of the end pointer 815.

At step S1026, the PCB control sequencer 203 stores the obtained cache block number 1003, with the corresponding socket number 1002, in the address converter 1303 in the PCB cache memory controller 212. Thereafter, the TCPCB is registered at the address of the cache block number 1004 in the PCB cache memory 121. As described above, the address converter 1303 converts the address 1301 of the socket number 1002 requested from the PCB control sequencer 203 and the DMA controller 205 to an address 1305 of the cache block number 1003 in the PCB cache memory 121.

On the other hand, in step S1027, when there is no unused socket number, the PCB manager 211 reports absence of unused socket number to the sub processor as a request originator, and as a result, the connection establishment becomes unsuccessful. There may be no unused socket number managed by the PCB manager 211. As the TCPCB group 508 to 510 are provided in the main memory 104, the total number of the socket numbers is limited based on the capacity of the main memory 104. Generally, the connection establishment is a negotiation matter and may be unsuccessful.

FIGS. 8A and 8B are a flowcharts showing the operation of the PCB controller 120 when a TCPCB acquisition request is issued from a sub processor to the PCB controller 120.

Upon TCP packet transmission (316 in FIG. 3), the TCPCB acquisition request is handled on the assumption that the socket number is known, and processing is started from step S913. The TCPCB acquisition request is issued by the sub processor A 111 in charge of the pipeline stage 311 as preprocessing of the TCP pipeline processing stage 312. The sub processor A 111 performs a part of the processing in the socket API 302. When a transmission instruction is received from the main processor 101, the sub processor A 111 issues a request for acquisition of a TCPCB corresponding to the socket number to the PCB controller 120. Note that as described below, a TCPCB is prepared on the PCB cache memory 121 based on the request from the sub processor A 111. Thereafter, the sub processor C 113 performs TCP processing using the TCPCB existing on the PCB cache memory 121. At this time, the sub processor C 113 obtains the TCPCB via the PCB control sequencer 203 in the PCB controller 120.

On the other hand, upon TCP packet reception (315 in FIG. 3), the sub processor D 114 in charge of the IP processing pipeline stage 313 as preprocessing of the TCP pipeline processing stage 312 issues a TCPCB acquisition request. The sub processor D 114 performs processing regarding a reception operation in the IP protocol processing in the MAC driver 305 and the IP layer 304.

A received frame sent from the Ethernet 136 is stored into the reception buffer memory in the data path controller 133 via the PHY 135 and the MAC 134. The data path controller 133 notifies the sub processor D 114 of the start of reception at the same time as the start of storage in the reception buffer memory.

Thereafter, if the received frame sent to the reception buffer memory is an IP packet, then when an IP header and all or most of higher protocol header areas have been transferred, the data path controller 133 notifies the sub processor D 114 of the reception of IP packet header.

Upon reception of the above notification, the sub processor D 114 starts interpretation of the IP packet header. The sub processor D 114 accesses the reception buffer memory in the data path controller 133 to read the header. Next, the sub processor D 114 checks validity of the IP header regarding items other than an IP datagram length in the header. When the higher protocol is TCP, the sub processor D 114 obtains socket information.

As described above, at step S911, the PCB controller 120 obtains socket information under the instruction of TCPCB acquisition from the sub processor D 114.

In step S912, the PCB control sequencer 203 obtains a corresponding socket number with the socket information as a search key. The obtained socket number will be referred to as a "socket number 901" here. At step S912, as described at step S1014, the socket number is obtained from the CAM 1 (117) with the socket information as a search key. When the connection has been established, socket information to be obtained has been registered in the progress of TCPCB generation. At step S928, when the search has been successful and a socket number has been obtained, the process proceeds to step S913. When the acquisition of socket number has failed, the process proceeds to step S929.

In step S929, the PCB controller 120 notifies the sub processor D 114 of the failure of acquisition of socket number. The failure of acquisition of socket number means that the received TCP packet is a SYN packet exchanged upon establishment of connection or is an improper packet. The subsequent processing is succeeded from the sub processor D 114 that received the notification to the sub processor B 112 in the TCP processing pipeline stage 312.

On the other hand, at step S913, the PCB control sequencer 203 obtains a corresponding cache block number with the socket number 901 as a search key. The obtained cache block number will be referred to as a "cache block number 902" here. In the search processing, the CMA 2 (118) is searched with the socket number as a search key, and the cache block number 902 corresponding to the socket number 901 is reported from the CAM controller 201 to the PCB control sequencer 203.

In step S914, when the acquisition of cache block number has been successful, the process proceeds to step S927, whereas when the acquisition of cache block number has failed, the process proceeds to step S915. The failure of acquisition of cache block number means that no corresponding TCPCB exists on the PCB cache memory 121.

In step S915, the PCB control sequencer 203 obtains an unused cache block number from the PCB manager 211. The obtained unused cache block number will be referred to as a "cache block number 903" here. The processing at this step is the same as that at step S1015.

In step S916, when there is no unused cache block number and the acquisition of unused cache block number 902 has failed, the process proceeds to step S917. When the acquisition of unused cache block number 902 has been successful, the process proceeds to step S923.

In step S917, the PCB control sequencer 203 obtains a socket number corresponding to the oldest cache block number of the earliest access from the LRU table 206. The obtained cache block number will be referred to as a "cache block number 904", and the corresponding socket number, as a "socket number 905" here. The processing in this step is the same as that in step S1017.

In step S918, the DMA controller 205 saves the TCPCB with the cache block number 904 on the PCB cache memory 121 into a TCPCB storage position of the socket number 905 on the main memory 104. The processing in this step is the same as that in step S1018.

In step S919, the PCB control sequencer 203 registers the socket number 901 at the address of the cache block number 904 in the CAM 2 (118). The processing in this step is the same as that in step S1019.

In step S920, the DMA controller 205 obtains the TCPCB with the socket number 901 on the main memory 104, and writes it in the cache block with the cache block number 904 on the PCB cache memory 121.

In step S921, the PCB control sequencer 203 updates the LRU table 206. In this update, the cache block with the cache block number 904 is connected in front of the end pointer 815. By this processing, the order of saving of the cache block with the cache block number 904 to the main memory 104 can be retarded.

In step S922, the PCB control sequencer 203 stores the obtained cache block number 904, with the socket number 901, in the address converter 1303 (FIG. 13) in the PCB cache memory controller 212. The address converter 1303 converts the address 1301 of the socket number 901 requested from the PCB control sequencer 203 to an address 1305 of the cache block number 904 in the PCB cache memory 121.

On the other hand, at step S923, the PCB control sequencer 203 instructs the CAM controller 201 to register the socket number 901 at the address of the cache block number 903 in the CAM 2 (118). In accordance with the instruction, the CAM controller 201 registers the socket number 901 at the address of the cache block number 903 in the CAM 2 (118).

In step S924, the DMA controller 205 obtains the TCPCB with the socket number 901 on the main memory 104, and writes it in the cache block position of the cache block number 903 on the PCB cache memory 121.

In step S925, the PCB control sequencer 203 updates the LRU table 206. In this processing, the cache block with the cache block number 903 is added in front of the end pointer 815.

In step S926, the PCB control sequencer 203 stores the obtained cache block number 903, with the socket number 901, in the address converter 1303 in the PCB cache memory controller 212. The converter 1303 converts the address 1301 of the socket number 901 requested from the PCB control sequencer 203 to the address 1305 of the cache block number 903 in the PCB cache memory 121.

On the other hand, in step S927, the PCB control sequencer 203 stores the obtained cache block number 902 in the address converter 1303 in the PCB cache memory controller 212. As described above, at the timing of TCP processing by the sub processor B 112 or the sub processor C 113, the TCPCB already exists on the PCB cache memory 121. Accordingly, the sub processor B 112 or the sub processor C 113 can read the TCPCB from the PCB cache memory 121 using the socket number.

FIG. 9 is a flowchart showing the operation of the PCB controller 120 when a TCPCB deletion request is issued from the sub processor A 111 to the PCB controller 120. The sub processor A 111 performs a part of the processing in the socket API 1302.

The deletion of a TCPCB is a process which returns socket and cache block number and releases the related resources when the TCPCB becomes unnecessary for connection release or the like.

At step S1111, the PCB control sequencer 203 receives a TCPCB deletion request from the sub processor A 111, and at the same time, obtains a corresponding socket number 1101.

At step S1112, the PCB control sequencer 203 instructs the CAM controller 201 to delete the content (socket information) of the socket number 1102 in the CAM 1 (117). In accordance with the instruction, the CAM controller 201 deletes the content (socket information) of the socket number 1102 in the CAM 1 (117).

In step S1113, it is determined whether or not a TCPCB to be deleted exists on the PCB cache memory 121. For this purpose, the PCB control sequencer 203 instructs the CAM controller 201 to examine the existence/absence of cache block number in the CAM 2 (118) with the socket number 1102 as a search key. In accordance with the instruction, the CAM controller 201 examines the existence/absence of cache block number in the CAM 2 (118) with the socket number 1102 as a search key, and returns the result of examination to the PCB control sequencer 203.

In step S1114, when the acquisition of cache block number has failed, the deletion of TCPCB is completed. When the acquisition of cache block number has been successful, the process proceeds to step S1115. When the acquisition of cache block number has failed, no corresponding TCPCB exists on the PCB cache memory 121. Accordingly, the LRU table 206 is not updated. Further, as the TCPCB of the socket number 1102 on the main memory 104 is rewritten upon and after generation of new TCPCB, it is not necessary to delete the TCPCB.

In step S1115, the PCB control sequencer 203 returns the cache block number 1103 and the socket number 1102 to the PCB manager 211. In accordance with this processing, the PCB manager 211 updates the PCB management table 210 so as to indicate that the cache block number 1103 and the socket number 1102 are unused.

In step S1116, the PCB control sequencer 203 instructs the CAM controller 201 to delete the content (socket number) of the cache block number 1103 in the CAM 2 (118). In accordance with the instruction, the CAM controller 201 deletes the content (socket number) of the cache block number 1103 in the CAM 2 (118).

In step S1117, the PCB control sequencer 203 instructs the main memory controller 103 to delete the TCPCB with the socket number 1102 on the main memory 104. In accordance with the instruction, the main controller 103 deletes the TCPCB with the socket number 1102 on the main memory 104. Further, the PCB control sequencer 203 may instruct the PCB cache memory controller 212 to delete the TCPCB with the socket number 1102 on the PCB cache memory 121. In this case, in accordance with the instruction, the PCB cache memory controller 212 deletes the TCPCB with the socket number 1102 on the PCB cache memory 121.

In step S1118, the PCB control sequencer 203 updates the LRU table 206. In this update processing, the cache block used by the TCPCB to be deleted is removed from the connection on the LRU table 206.

The TCP includes processing for acknowledgment response in addition to application request transmission/reception processing. In the flow of the acknowledgment response processing (314 in FIG. 3), as a corresponding TCPCB is taken over from the sub processor B 112 which performs the reception processing to the sub processor C 113 the transmission processing, it is not necessary to update the PCB cache memory 121.

As described above, a TCPCB is read onto the PCB cache memory 121 in the preceding stage of the pipeline stage to perform the TCP processing. Accordingly, at the timing of TCP processing by the sub processor B 112 or the sub processor C 113, the TCPCB already exists on the PCB cache memory 121, and the TCPCB access can be performed in short time without breakdown of the pipeline processing. Even when a number of connections are generated and the PCB cache memory 121 is frequently updated, the pipeline processing is not broken down. As a result, the combination of TCPCB caching and the pipeline processing greatly reduces the time for processing of protocol stack which conventionally has been heavy-loaded processing. In the present embodiment, the Full-wire speed of the gigabit Ethernet can be attained in the system at an operational frequency of merely about 100 MHz. In some conventional system where this performance is realized with a general PC, a processor is operated at an operation frequency of about 3 GHz.

In the present embodiment, the TCP protocol has been described as a representative protocol processing. Also in the case of SSL/TLS protocol communication, it is necessary to identify plural sessions and a PCB is required for each session. Note that the session corresponds to a connection in the TCP communication.

SSL/TLS is a security communication protocol on the socket API 302, and is processed in the sub processor A 111. The sub processor B 112 in the previous pipeline stage performs the SSL/TLS session identification, and reads a corresponding PCB onto the PCB cache memory 121. Upon transmission, the main processor 101 processes the previous pipeline stage. Also, an area for SSL/TLS session is ensured in the PCB cache memory 121, the PCB management table 210 and the LRU table 206. Further, a specialized cache block, an LRU table and a bitmap table for management of cache block numbers are prepared.

It is apparent from the above description that the present system is applicable to protocols such as TCP protocol, SSL/TLS protocol and IPsec to hold and process different context information for communication destinations in protocol processing.

Further, the object of the present invention can also be achieved by providing a storage medium holding software program code for performing the functions of the above-described embodiment to a system or an apparatus, reading the program code with a computer of the system or apparatus from the storage medium, then executing the program.

In this case, the program code read from the storage medium realizes the functions of the above-described embodiment, and the storage medium holding the program code constitutes the present invention.

Further, the storage medium, such as a flexible disk, a hard disk, an optical disk, a magneto-optical disk, a CD-ROM, a CD-R, a DVD, a magnetic tape, a non-volatile type memory card, and a ROM can be used for providing the program code.

Furthermore, the present invention includes a case where an OS or the like working on the computer performs a part or entire actual processing in accordance with designations of the program code read by a computer and realizes the functions of the above-described embodiment.

Furthermore, the present invention also includes a case where, after the program code read from the storage medium is written in a memory provided in a function expansion unit which is connected to the computer, a CPU or the like performs a part or entire process in accordance with designations of the program code and realizes the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-334911 filed Dec. 12, 2006, which is hereby incorporated by reference herein in its entirety.

What is claimed is:

1. A communication apparatus comprising:
a plurality of processing units to perform hierarchically pipeline processing on communication data for a plurality of communication protocols in a hierarchical structure, wherein the plurality of processing units comprise a first processing unit which performs processing for a first communication protocol of a first layer, a second processing unit which performs processing for a second communication protocol of a second layer different from the first layer after the processing for the first communication protocol by the first processing unit, and a third processing unit which performs processing for the second communication protocol of the second layer after a third layer different from the first layer and the second layer is processed;
a first memory unit that stores control information for processing of the second communication protocol of the second layer;
a second memory unit that is a higher-speed accessible memory than the first memory unit; and
a controller that transfers the control information between the first memory unit and the second memory unit,
wherein the first processing unit performs processing for the first communication protocol of the first layer and causes the controller to transfer the control information from the first memory unit to the second memory unit, and
wherein the second processing unit and the third processing unit perform the processing for the second communication protocol of the second layer using the control information stored in the second memory unit transferred from the first memory unit.

2. The communication apparatus according to claim 1, further comprising a unit to convert identification information for identification of a connection to an address in the second memory unit.

3. The communication apparatus according to claim 1,
wherein the second processing unit performs TCP reception processing, and
wherein the first processing unit causes the controller to transfer information corresponding to socket information included in a header of a received IP packet from the first memory unit to the second memory unit.

4. The communication apparatus according to claim 1, wherein, when the control information used by the second processing unit is not stored in the second memory unit, the first processing unit causes the controller to transfer the control information from the first memory unit to the second memory unit.

5. The communication apparatus according to claim 1, wherein, in accordance with release of a connection, the first processing unit invalidates control information corresponding to the released connection stored in the second memory unit.

6. The communication apparatus according to claim 1, wherein the second processing unit reads the control information stored in the second memory unit for processing of communication data.

7. An information transfer method in a communication apparatus having a plurality of processing units to perform hierarchically pipeline processing on communication data for a plurality of communication protocols in a hierarchical structure, wherein the plurality of processing units comprise a first processing unit which performs processing for a first communication protocol of a first layer, a second processing unit which performs processing for a second communication protocol of a second layer different from the first layer after the processing for the first communication protocol by the first processing unit, and a third processing unit which performs processing for the second communication protocol of the second layer after a third layer different from the first layer and the second layer is processed, the information transfer method comprising:

storing control information for processing of the second communication protocol of the second layer in a first memory unit; and transferring, using a controller, the control information between the first memory unit and a second memory unit that is a higher-speed accessible memory than the first memory, wherein the first processing unit performs processing for the first communication protocol of the first layer and causes the controller to transfer the control information from the first memory unit to the second memory unit, and wherein the second processing unit and the third processing unit perform the processing for the second communication protocol of the second layer using the control information stored in the second memory unit transferred from the first memory unit.

8. The method according to claim 7, further comprising the step of converting identification information for identification of a connection to an address in the second memory unit.

9. The method according to claim 7, wherein the second processing unit performs TCP reception processing, and wherein the first processing unit causes the controller to transfer information corresponding to socket information included in a header of a received IP packet from the first memory unit to the second memory unit.

10. The method according to claim 7, wherein, when the control information used by the second processing unit is not stored in the second memory unit, the first processing unit causes the controller to transfer the control information from the first memory unit to the second memory unit.

11. The method according to claim 7, wherein, in accordance with release of a connection, the first processing unit invalidates the control information corresponding to the released connection stored in the second memory unit.

12. The method according to claim 7, wherein the second processing unit reads the control information stored in the second memory unit for processing of communication data.

13. A non-transitory computer-readable storage medium storing a program, where the program causes a computer to execute the method according to claim 7.

14. A communication apparatus comprising:

a first processing unit that performs processing of an IP layer on communication data;

a second processing unit that performs processing of a TCP layer on the communication data after the processing of the IP layer by the first processing unit;

a third processing unit that performs processing of the TCP layer on the communication data after an application layer is processed;

a first memory unit that stores control information for processing of the TCP layer;

a second memory unit that is a higher-speed accessible memory than the first memory unit; and a controller that transfers the control information between the first memory unit and the second memory unit, wherein the first processing unit performs processing of the IP layer and causes the controller to transfer the control information from the first memory unit to the second memory unit, and wherein the second processing unit and the third processing unit perform the processing of the TCP layer using the control information stored in the second memory unit transferred from the first memory unit.

15. The communication apparatus according to claim 14, wherein the control information is TCPCB (TCP Protocol Control Block).

16. A method for a communication apparatus, the method comprising:

performing processing of an IP layer on communication data;

performing processing of a TCP layer on the communication data after performing processing of the IP layer;

performing processing of the TCP layer on the communication data after an application layer is processed;

storing control information in a first memory unit; and transferring control information between the first memory unit and a second memory unit that is higher-speed accessible than the first memory unit, wherein performing processing of the IP layer causes transfer of the control information from the first memory unit to the second memory unit, and wherein performing processing of the TCP layer after performing processing of the IP layer and performing processing of the TCP layer after an application layer is processed use the control information stored in the second memory unit transferred from the first memory unit.

17. A non-transitory computer-readable medium storing a program that comprises instructions which, when executed by a processor, cause a communication apparatus to perform a method comprising:

performing processing of an IP layer on communication data;

performing processing of a TCP layer on the communication data after performing processing of the IP layer;

performing processing of the TCP layer on the communication data after an application layer is processed;

storing control information in a first memory unit; and transferring control information between the first memory unit and a second memory unit that is higher-speed accessible than the first memory unit, wherein performing processing of the IP layer causes transfer of the control information from the first memory unit to the second memory unit, and wherein performing processing of the TCP layer after performing processing of the IP layer and performing processing of the TCP layer after an application layer is processed use the control information stored in the second memory unit transferred from the first memory unit.

* * * * *